US008772984B2

(12) United States Patent
Chang (10) Patent No.: US 8,772,984 B2
(45) Date of Patent: Jul. 8, 2014

(54) FITNESS EQUIPMENT ENERGY REGENERATING AND SAVING SYSTEM

(75) Inventor: Cheng-Ching Chang, Taichung (TW)

(73) Assignee: Rhymebus Corporation, Taichung (TW)

( * ) Notice: Subject to any disclaimer, the term of this patent is extended or adjusted under 35 U.S.C. 154(b) by 443 days.

(21) Appl. No.: 12/968,278

(22) Filed: Dec. 15, 2010

(65) Prior Publication Data

US 2012/0007367 A1    Jan. 12, 2012

(30) Foreign Application Priority Data

Jul. 7, 2010 (TW) ................................ 99122371 A (51) Int. Cl.
| | |
|---|---|
| G05F 3/06 | (2006.01) |
| F03G 5/06 | (2006.01) |
| A63B 21/005 | (2006.01) |
| H02J 3/38 | (2006.01) |
| H02P 23/06 | (2006.01) |
| A63B 24/00 | (2006.01) |
| H02P 23/00 | (2006.01) |
| A63B 22/00 | (2006.01) |
| A63B 21/00 | (2006.01) |

(52) U.S. Cl.
CPC .............. *F03G 5/06* (2013.01); *A63B 21/0053* (2013.01); *H02J 3/38* (2013.01); *H02P 23/06* (2013.01); *A63B 24/0087* (2013.01); *H02P 23/0063* (2013.01); *A63B 22/0023* (2013.01); *A63B 2021/0054* (2013.01); *A63B 21/00178* (2013.01); *A63B 2225/50* (2013.01); *A63B 22/00* (2013.01)

USPC ............................................... 307/151; 482/2

(58) Field of Classification Search
USPC ............................................... 307/151; 482/2
See application file for complete search history.

(56) References Cited

U.S. PATENT DOCUMENTS

| | | | | |
|---|---|---|---|---|
| 4,366,390 | A * | 12/1982 | Rathmann ....................... 307/66 |
| 5,844,328 | A * | 12/1998 | Furst ............................... 307/66 |
| 6,321,145 | B1 * | 11/2001 | Rajashekara .................... 701/22 |
| 6,624,533 | B1 | 9/2003 | Swanson et al. |
| 7,564,207 | B2 * | 7/2009 | Fujimura ....................... 318/432 |
| 2004/0085046 | A1 | 5/2004 | Ye et al. |
| 2004/0106502 | A1 | 6/2004 | Sher |
| 2007/0201727 | A1 * | 8/2007 | Birrell et al. ................... 382/115 |
| 2008/0172328 | A1 | 7/2008 | Ajilian |
| 2009/0247366 | A1 * | 10/2009 | Frumer ............................ 482/2 |

(Continued)

FOREIGN PATENT DOCUMENTS

| | | |
|---|---|---|
| CN | 200954348 Y | 10/2007 |
| EP | 0403295 A1 | 12/1990 |

(Continued)

*Primary Examiner* — Rexford Barnie
*Assistant Examiner* — Joseph Inge
(74) *Attorney, Agent, or Firm* — CKC & Partners Co., Ltd.

(57) ABSTRACT

A fitness equipment energy regenerating and saving system is provided. The system includes a bidirectional power converter, a bidirectional power drive, a generator, and an energy managing circuit. The energy managing circuit activates the bidirectional power converter so as to enable the bidirectional power drive to feedback the power generated by the generator to an electrical grid when the generator is operated in a generator mode. The energy managing circuit sets the bidirectional power converter to a current-regulating mode so as to enable the bidirectional power drive to obtain the power required for driving from the electrical grid when the generator is operated in a motor mode.

18 Claims, 13 Drawing Sheets

(56) References Cited

U.S. PATENT DOCUMENTS

| | | |
|---|---|---|
| 2009/0271336 A1 | 10/2009 | Franks |
| 2009/0315336 A1 | 12/2009 | Harr |
| 2010/0145539 A1* | 6/2010 | Schmidt .................. 700/295 |
| 2010/0259043 A1* | 10/2010 | Balsamo ...................... 290/7 |
| 2011/0160944 A1* | 6/2011 | Yang .............................. 701/22 |

FOREIGN PATENT DOCUMENTS

| | | |
|---|---|---|
| JP | 06351266 A | 12/1994 |
| JP | 2000134968 A | 5/2000 |
| JP | 2004289950 A | 10/2004 |
| JP | 2004331004 A | 11/2004 |
| TW | M375355 | 3/2010 |

* cited by examiner

FITNESS EQUIPMENT ENERGY REGENERATING AND SAVING SYSTEM

RELATED APPLICATIONS

This application claims priority to Taiwan Patent Application Number 99122371, filed on Jul. 7, 2010, which is herein incorporated by reference.

BACKGROUND

1. Technical Field

The present disclosure relates to an electrical power device, and more particularly to an electrical power device of a fitness equipment.

2. Description of Related Art

Health concept is an important issue to modern people. It requires not only diet controlling but also exercising to make people healthy. Therefore, fitness equipments such as treadmills, weightlifting machines and rowing machines are popular apparatuses that enable people to train their own bodies in their city life. Besides, environmental awareness is also an important issue to modern people. Resources recycling and energy regenerating are the major concepts to protect the earth. Although it is not a new idea to recycle the energy generated by people, especially when exercising, yet there is no suitable mechanism to achieve it.

SUMMARY

In one embodiment of the disclosure, a fitness equipment energy regenerating and saving system is disclosed. The fitness equipment energy regenerating and saving system includes a bidirectional power converter, a bidirectional power drive, a generator, and an energy managing circuit. The bidirectional power converter has many power transistors. One end of the bidirectional power converter is electrically connected to an electrical grid, and the other end of the bidirectional power converter is electrically connected to one end of the bidirectional power drive. The other end of the bidirectional power drive is electrically connected to the generator, and thus the generator is used to link up a fitness equipment and the generator can be driven by the bidirectional power drive and performs as a motor. The energy managing circuit is electrically connected to the bidirectional power converter, the bidirectional power drive and the generator to determine whether the generator is operated in a generator mode or a motor mode. The energy managing circuit activates the bidirectional power converter so as to enable the bidirectional power drive to feedback the power generated by the generator to the electrical grid when the generator is operated in the generator mode. The energy managing circuit sets the bidirectional power converter to a current-regulating mode so as to enable the bidirectional power drive to obtain the power required for driving from the electrical grid when the generator is operated in the motor mode.

DETAILED DESCRIPTION

Although it is a common idea to feedback the power generated from fitness equipments which are being operated by people to the commercial electricity system, yet the mechanism thereof fails to be realized. The reason is that the rotor loading is varying with different users or the same user operating the fitness equipment in different manners. Therefore, the feedback power generated by the fitness equipment is time varying and unstable. Based on years of experience in the related industry to conduct extensive research and experiments, the present invention provides a fitness equipment energy to regenerating and saving system to overcome the aforementioned problems. In detail, the system provides control strategies based on the varying of the loading to efficiently regenerate, recycle and feedback the electrical power generated by the fitness equipment. Furthermore, the present invention provides detail circuits of the system for not only selecting different strategies to varying loadings, but also adjusting the power factor to feedback the power to the commercial electricity system.

Figure 1:
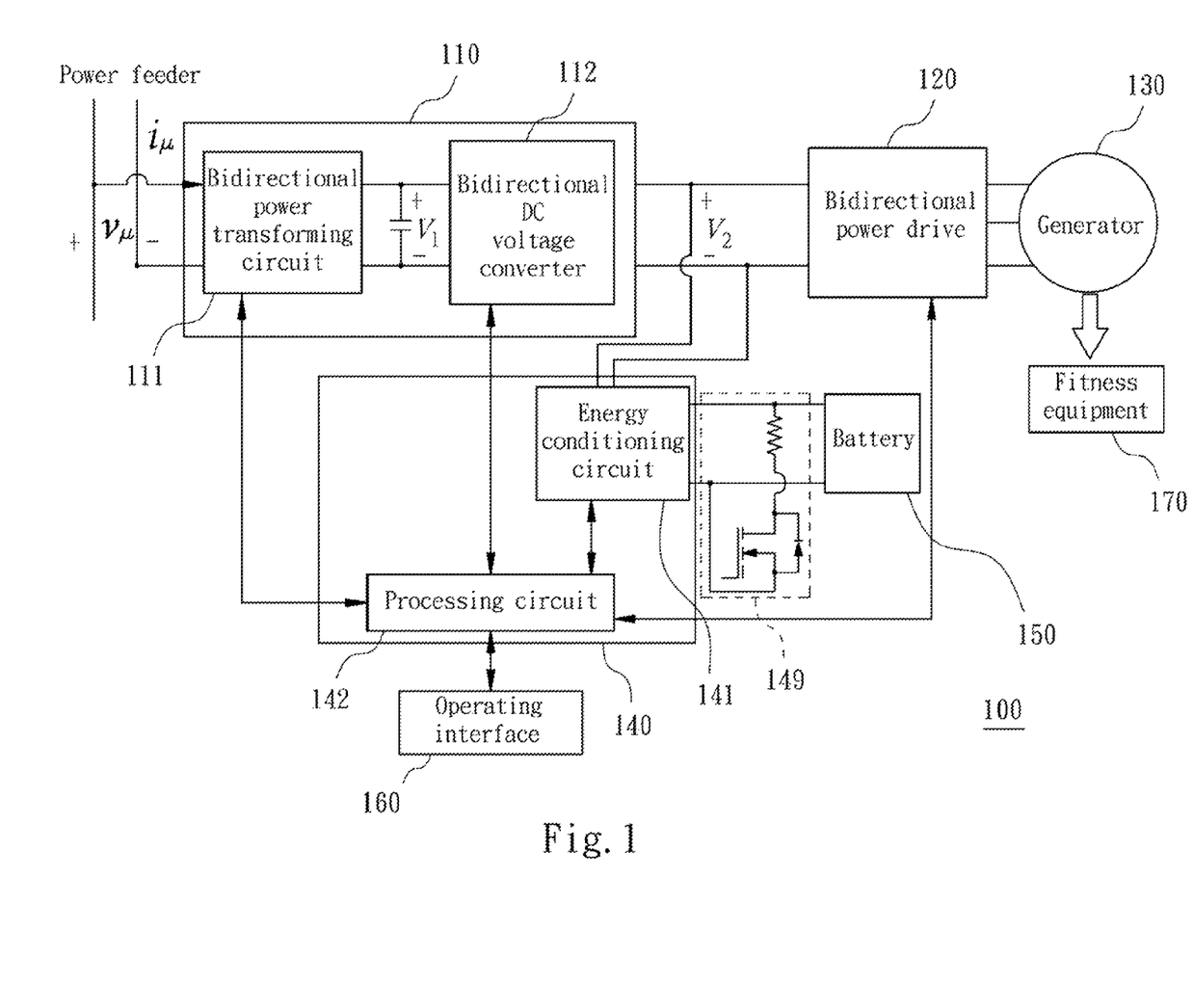
FIG. 1 is a functional block view of the fitness equipment energy regenerating and saving system according to one embodiment of the disclosure.

Referring to FIG. 1, FIG. 1 is a functional block view of the fitness equipment energy regenerating and saving system according to one embodiment of the disclosure. The system 100 includes a bidirectional power converter 110, a bidirectional power drive 120, a generator 130, an energy managing circuit 140, a battery 150, an operating interface 160 and a fitness equipment 170. The battery 150 and the operating interface 160 are not requisites, and a discharging module 149 is applied when the battery 150 exists. The fitness equipment 170 exists when the embodiment is implemented by people, but the system 100 can be sold without the fitness equipment 170. In other words, the bidirectional power converter 110, the bidirectional power drive 120, the generator 130 and the energy managing circuit 140 can be integrated into a module device. When being implemented, the generator 130 is used to replace the motor in any traditional kind of fitness equipments, and the generator 130 can be driven as a motor by the bidirectional power drive 120. The connections of the respective elements are illustrated in FIG. 1, and the operation principles are described below.

To make the energy managing circuit 140 actually match the loading characteristic of the generator 130, the energy managing circuit 140 is programmed and designed to control the bidirectional power converter 110 and the bidirectional power drive 120 to perform multiple control strategies under the generator mode. In detail, the energy managing circuit 140 provides at least two control strategies when the system 100 does not include the battery 150, and provides at least three control strategies as follows when the battery 150 exists in the system 100.

First control strategy: when the generator 130 is rotated at a low speed and there has no battery 150, the bidirectional power drive 120 provides the generated power of the generator 130 to each module or element of the system 100, or releases the generated power of the generator 130 via the discharging module 149.

Second control strategy: when the condition of the system 100 is similar to that in the first control strategy but there is the battery 150, the energy managing circuit 140 sets the bidirectional power converter 110 to the current-regulating mode. The energy managing circuit 140 commands the bidirectional power drive 120 to obtain power from the generator 130, and thus the generated power is not only provided to each module or element of the system 100, but also used to charge the battery 150.

Third control strategy: when the generator 130 is rotated at a high speed, the energy managing circuit 140 activates the bidirectional power converter 110, and thus the generated power of the generator 130 is transmitted to the electrical grid, through the bidirectional power drive 120 and the bidirectional power converter 110. Meanwhile, the generated power is also applied to charge the battery 150 if necessary.

Figure 2A:
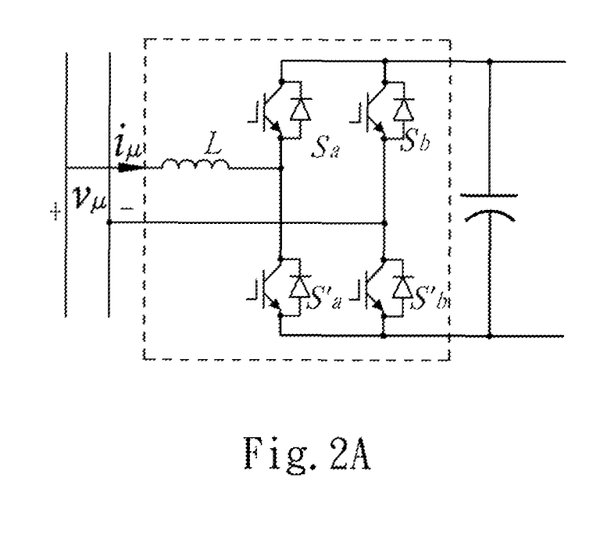
FIG. 2A is a circuit diagram of one embodiment of the bidirectional power transforming circuit 111 shown in FIG. 1.
Figure 2B:
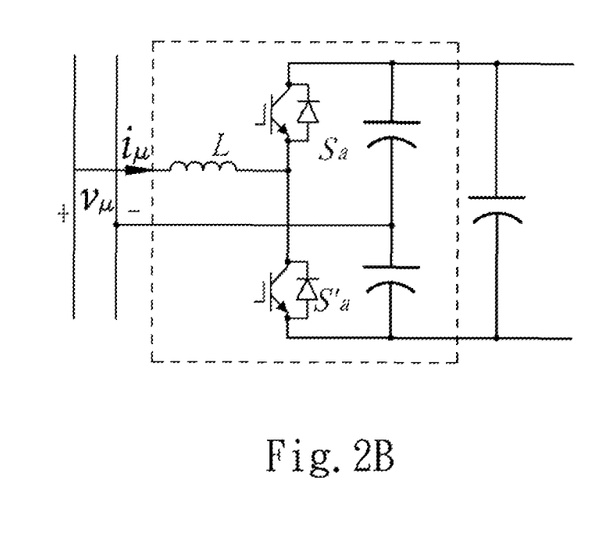
FIG. 2B is a circuit diagram of another embodiment of the bidirectional power transforming circuit 111 shown in FIG. 1.

On the other hand, the bidirectional power converter 110 can be formed from a bidirectional power transforming circuit 111 and a bidirectional DC voltage converter 112. Referring to FIG. 2A and FIG. 2B, FIG. 2A is a circuit diagram of one embodiment of the bidirectional power transforming circuit 111 shown in FIG. 1, and FIG. 2B is a circuit diagram of another embodiment of the bidirectional power transforming circuit 111 shown in FIG. 1. In FIG. 2A, the bidirectional power transforming circuit 111 is a full bridge transistor rectifier circuit, such as a silicon controlled rectifier (SCR). In FIG. 2B, the bidirectional power transforming circuit 111 is a half bridge rectifier circuit. When the system 100 is operated in a motor mode, i.e. the generator 130 is applied as a motor, the bidirectional power transforming circuit 111 transforms the alternating current provided by the electrical grid, i.e. the commercial electricity, into a DC power. The DC power is therefore provided to the bidirectional power drive 120, the generator 130 and the fitness equipment 170 in which the energy managing circuit 140 is embedded.

When the system is operated in the generating mode, i.e. the generator 130 is applied as a generator, the energy managing circuit 140 provides commanding signals to control the on-off timing of the power transistors in the bidirectional power transforming circuit 111, so as to feedback the generated power of the generator 130 to the electrical grid.

Figure 3:
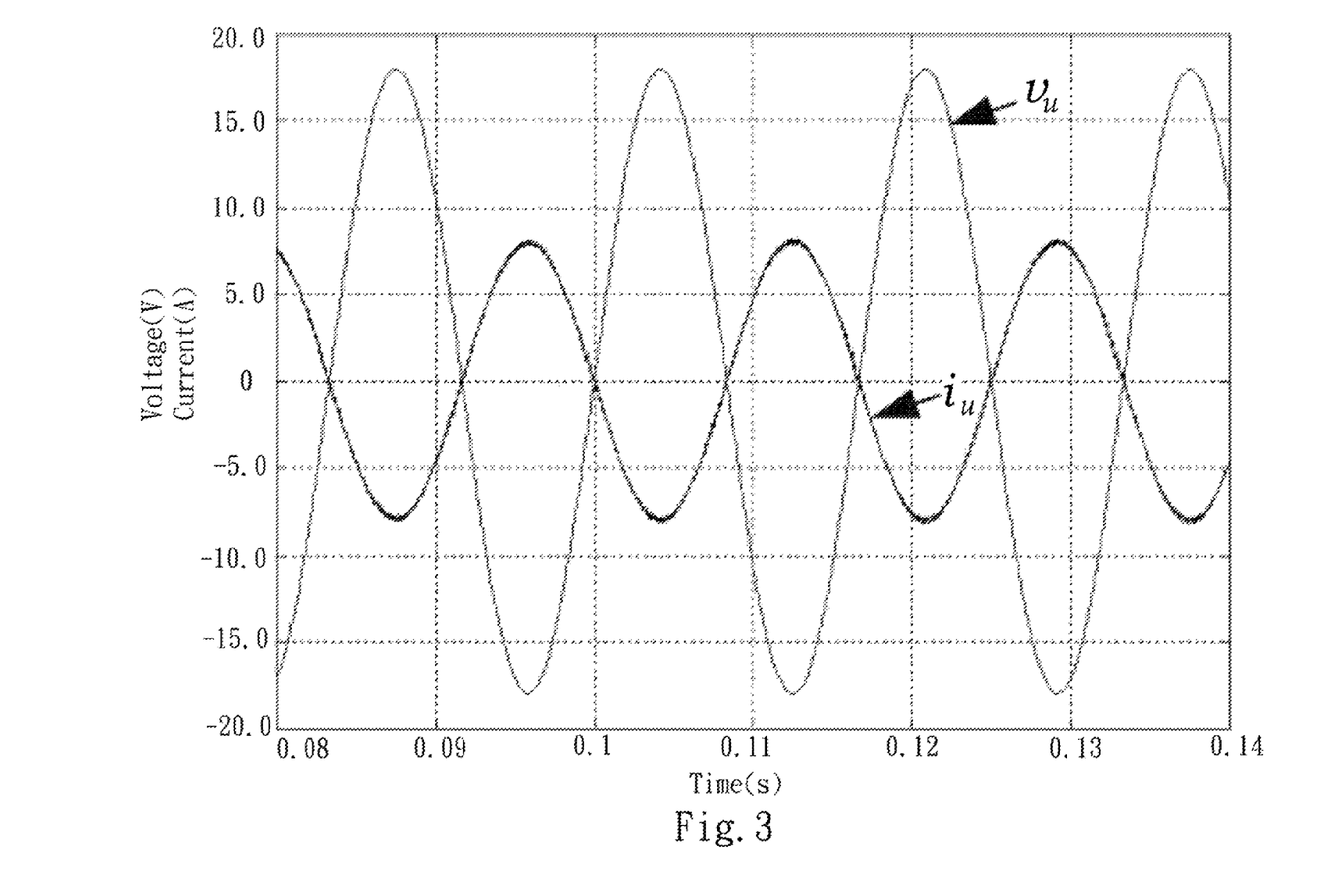
FIG. 3 is a waveform diagram generated by the bidirectional power transforming circuit 111 shown in FIG. 1.

Referring to FIG. 3, FIG. 3 is a waveform diagram generated by the bidirectional power transforming circuit 111 shown in FIG. 1. In the actual implementation of the embodiment, the power factor of the feedback power is larger than −0.95 that meets the international electrical power quality standard. The power factor adjusting mechanism of the embodiment is using a sensing circuit to detect the phase of the voltage on the electrical grid, and then controlling the bidirectional power transforming circuit 111 to make the feedback power become a sinusoidal current wave and the phase of the current lag the phase of the voltage by about 180 degree. Therefore, the power factor can be larger than −0.95, and the negative impact of the power feedback mechanism is decreased. However, the feedback current is not necessary to be a sinusoidal wave.

Figure 4:
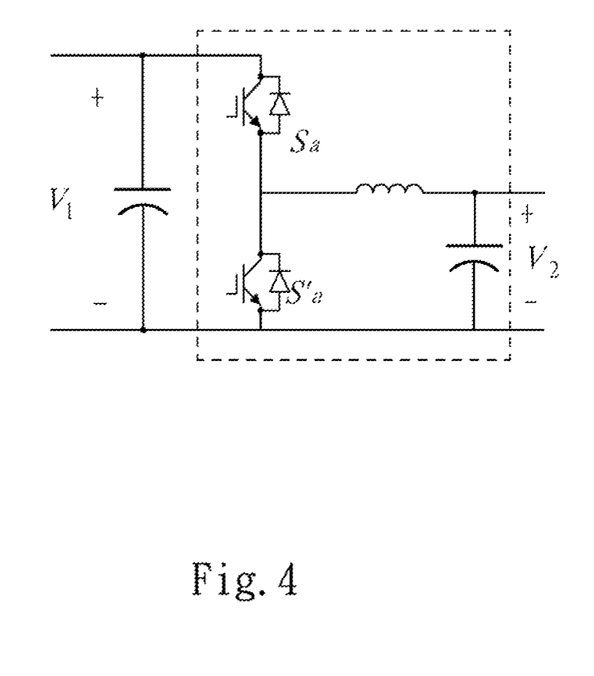
FIG. 4 is a circuit diagram of one embodiment of the bidirectional DC voltage converter 112 shown in FIG. 1.

Referring to FIG. 4, FIG. 4 is a circuit diagram of one embodiment of the bidirectional DC voltage converter 112 shown in FIG. 1. In FIG. 4, the bidirectional DC voltage converter 112 is achieved by a buck boost circuit including power transistors. The transistor $S_a$ and the transistor $S_a'$ are applied as the major switches of the buck boost circuit respectively, i.e. one to buck and the other to boost. Therefore, a pulse width modulation signal is used to control the transistors and thus control the voltage $V_2$. Basically, the voltage $V_1$ is fixed and the voltage $V_2$ is controllable based on the modes of the generator 130 and the rotating speed of itself. Particularly, the voltage $V_2$ is increased as long as the rotating speed of the generator 130 is increased either in the generator mode or the motor mode. The voltage $V_2$ is fixed at a specific value and will not be adjusted when the voltage $V_2$ is near to the voltage $V_1$.

Figure 5A:
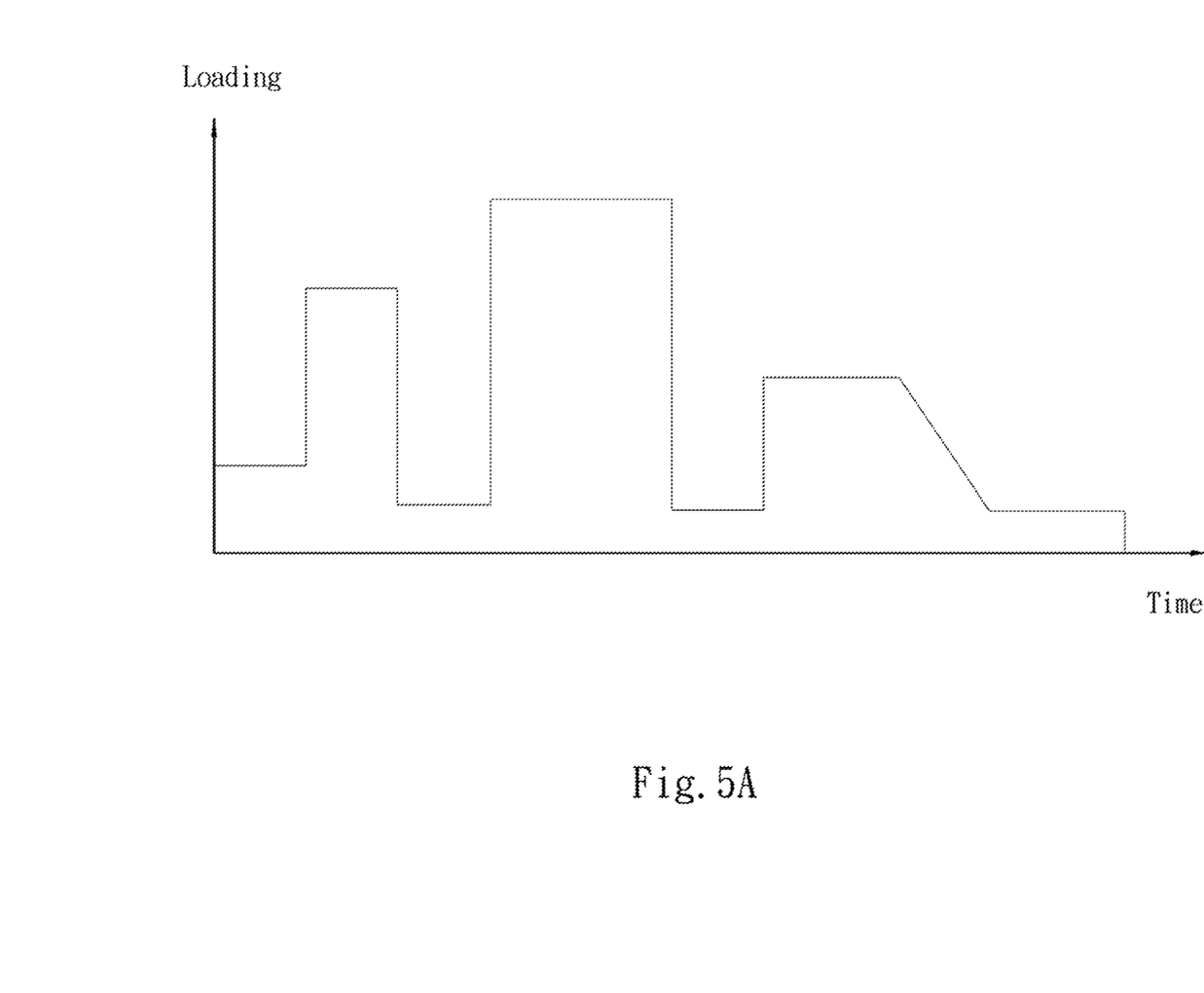
FIG. 5A is one diagram showing a loading characteristic curve of the generator 130 shown in FIG. 1.
Figure 5B:
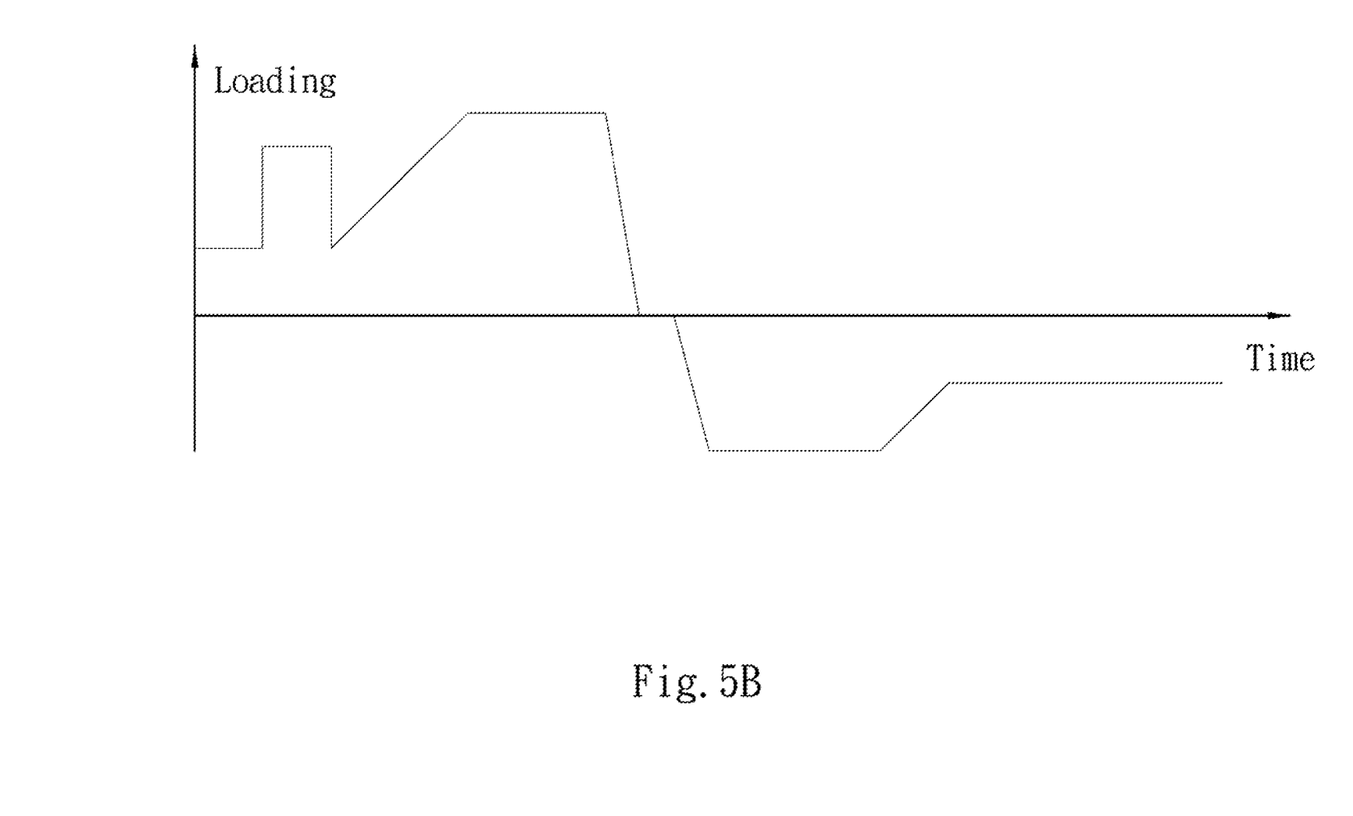
FIG. 5B is another diagram showing a loading characteristic curve of the generator 130 shown in FIG. 1.
Figure 5C:
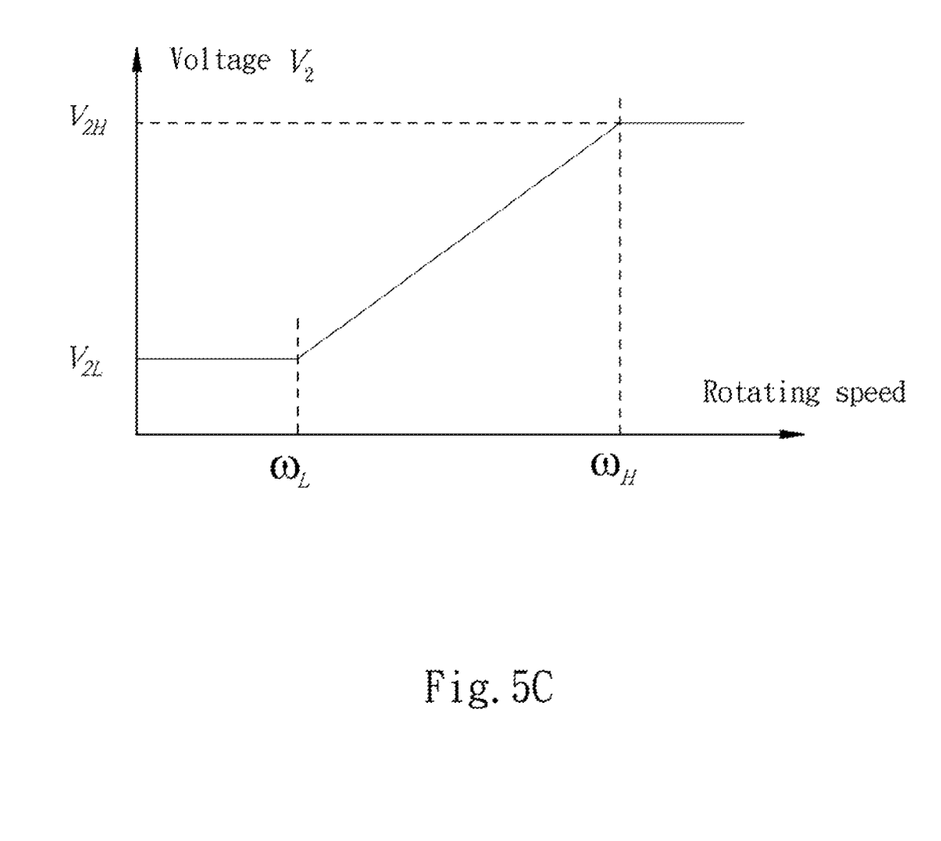
FIG. 5C illustrates a curve showing a generated voltage/rotating speed relationship of the generator 130 shown in FIG. 1.

Referring to FIG. 5A, FIG. 5B and FIG. 5C together, FIG. 5A is one diagram showing a loading characteristic curve of the generator 130 shown in FIG. 1. The loading characteristic curve is based on the actual situation of the fitness equipment, and therefore can be inputted by the user or the manufacturer of the fitness equipment, and then the bidirectional power drive 120 can be used to control the generator 130 based on the loading characteristic curve as shown in FIG. 5A to drive the fitness equipment 170. Additionally, the bidirectional power drive activates the generator to be the motor in the motor mode, and thus to move the limbs of the user actively. This scheme can be applied to release the pain of the body after a strenuous exercise, or be applied to help the rehabilitation treatment of a patient. FIG. 5B is another diagram showing a loading characteristic curve of the generator 130 shown in FIG. 1. As being depicted in FIG. 5B, the loading can be negative which means the generator is operated in the motor mode.

FIG. 5C illustrates a curve showing a generated voltage/rotating speed relationship of the generator 130 shown in FIG. 1. The energy managing circuit 140 is used to adjust the voltage $V_2$ of the system 100 based on the speed of the generator 130 when the generator 130 is operated in the generator mode. In detail, the voltage $V_2$ is fixed at the value $V_{2L}$ when the rotating speed is lower than the value $\omega_L$. The voltage $V_2$ is fixed at the value $V_{2H}$ when the rotating speed is higher than the value $\omega_H$. The voltage $V_2$ is adjusted based on the relation curve as shown in FIG. 5C when the rotating speed is located between the value $\omega_L$ and the value $\omega_H$.

Additionally, the mechanism described above can also be used to adjust the voltage $V_2$ so as to improve the efficiency of the system 100 when the generator 130 is operated in the motor mode. What is worthy to be noticed is that the magnitude of the voltage $V_2$ can be controlled by the energy managing circuit 140, the bidirectional power drive 120, or both. Therefore, when the generator 130 is operated in the generator mode, the energy generated when the user is doing an exercise, i.e. driving the loading, is used to provide the requirement of the whole system 100 or feedback to the commercial electricity. When the generator 130 is operated in the motor mode, the energy required to drive the generator 130 is provided by the commercial electricity, and thus the fitness equipment forces the user to continue the motion with his least power, thereby achieving the efficacy of muscle relief after severe exercise.

On the other hand, as shown in FIG. 1, the energy managing circuit 140 is formed from an energy conditioning circuit 141 and a processing circuit 142. The mechanisms described above are completed by collaborating the energy conditioning circuit 141 with the processing circuit 142. Concretely speaking, the energy conditioning circuit 141 is mainly applied as an energy buffer between the bidirectional power converter 110 and the bidirectional power drive 120. The energy conditioning circuit 141 is formed from a power converting circuit and a battery 150. The bidirectional power converter 110 is disabled when the power generation of the generator 130 is smaller than a threshold value, and the generated power is used to charge the battery 150. If the battery 150 is filled, the energy is released via the discharging module 149. However, if the energy stored in the battery 150 is lower than a threshold, the energy conditioning circuit 141 is triggered to charge the battery 150 by using the power obtained from the electrical grid or the generator 130.

When the battery 150 does not exist in the system 100 and the power generation of the generator 130 is smaller than the threshold value, the energy conditioning circuit 141 releases the electricity power generated by the generator 130 via the discharging module 149 or applies the electricity power generated by the generator 130 to each module and element in the system 100 directly. The energy conditioning circuit 141 can be formed, for example, from the circuit shown in FIG. 4, i.e. the same circuit structure as the bidirectional DC voltage converter 112.

Figure 6:
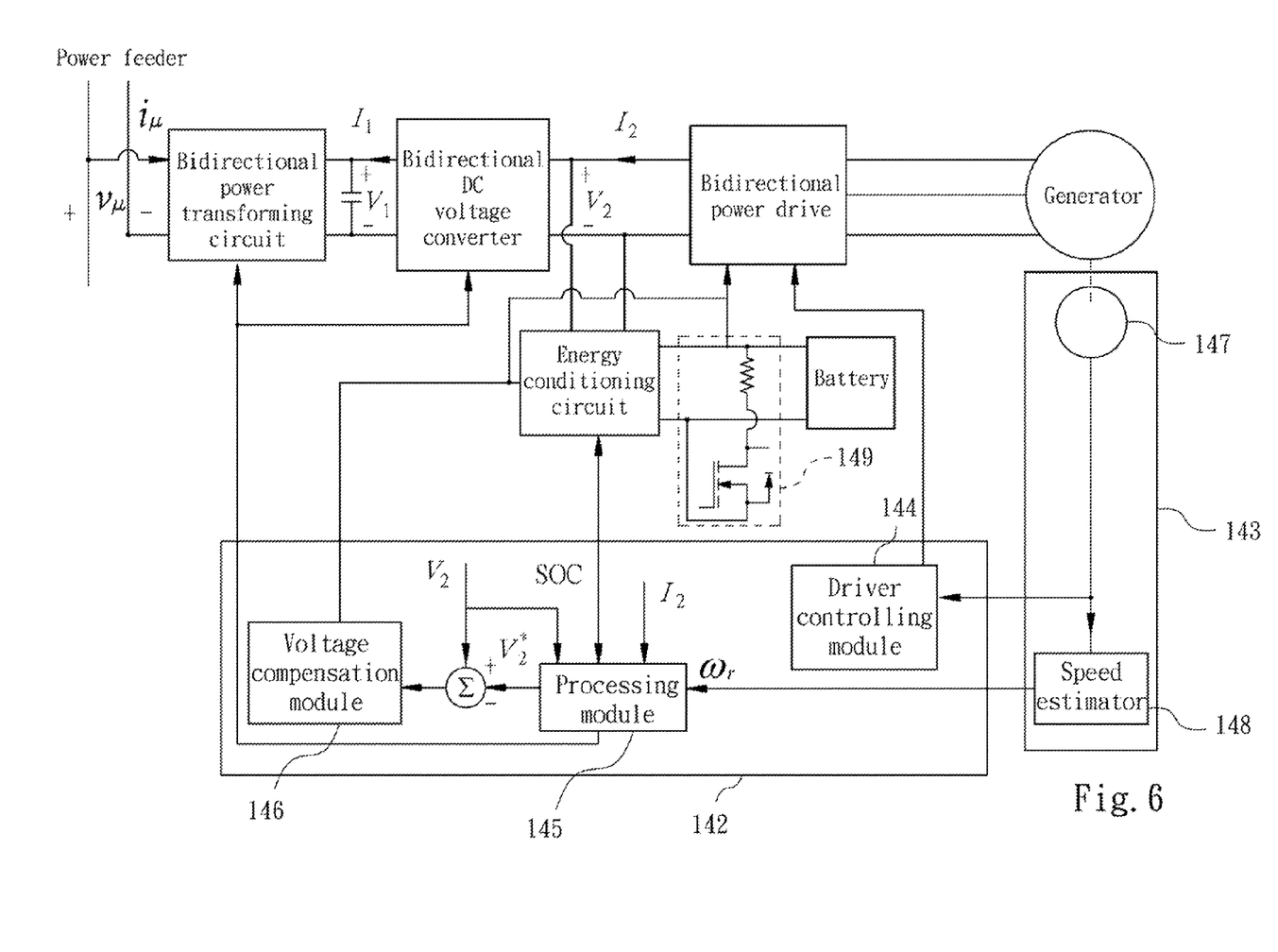
FIG. 6 is a detailed functional block view of FIG. 1.

Referring to FIG. 6, FIG. 6 is a detailed functional block view of FIG. 1. The processing circuit 142 further includes a rotational speed detector 143, a drive controlling module 144, a processing module 145 and a voltage compensation module 146. The rotational speed detector 143 is used to detect a rotational speed of the generator 130 under the generator mode. When the generator 130 is under the generator mode, the drive controlling module 144 is used to optimize the output voltage which is obtained by the bidirectional power drive 120 from the generator 130 and provided to the electrical grid in accordance with the rotational speed or generated power. When the generator 130 is under the motor mode, the drive controlling module 144 is used to control the output current which is obtained by the bidirectional power drive 120 from the electrical grid and provided to the generator 130 to control the speed of the generator 130. Briefly, the drive controlling module 144 controls the timing when the bidirectional power drive 120 obtains the alternating current power from the generator 130 based on the rotating speed.

The processing module 145 is used to determine an output loading of the generator 130 under the generator mode based on the rotational speed, the expected generating power of the generator 130 and a parameter received by the operating interface 160 that represents the requirement of a user when doing exercise, and to command the energy managing circuit 140 to feedback the generated power transformed from the exercising of the user to the electrical grid via the bidirectional power converter 110 in an alternating current manner. Briefly, the processing module 145 achieves the phase matching by controlling the timing when the bidirectional power converter 110 feedbacks power to the electrical grid in accordance with the rotating speed and the magnitude of the alternating current power under the generator mode. Meanwhile, the processing module 145 further provides a voltage compensation value to the voltage compensation module 146, and thus the voltage compensation module 146 drives the energy conditioning circuit 141 to compensate the voltage value that obtains from the generator 130 via the bidirectional power drive 120 based on the voltage compensation value. If the generation power is lower than the threshold, the discharging module 149 is enabled to release the power on the resistance. The voltage compensation module 146 can be achieved by software program or by hardware circuits such as the proportional integrator or the closed loop controlling circuit that has the similar function.

Figure 7:
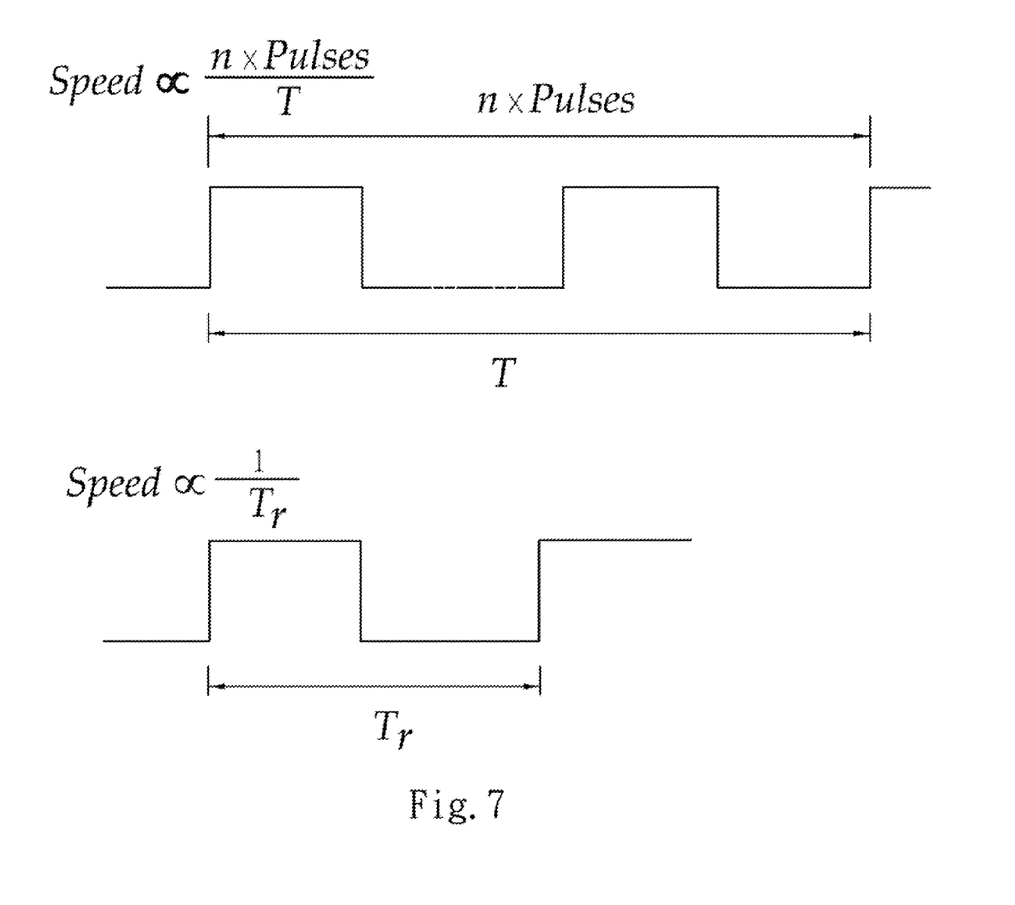
FIG. 7 is a pulse signal waveform diagram generated by the rotational speed detector 143 shown in FIG. 6.

Referring to FIG. 7, FIG. 7 is a pulse signal waveform diagram generated by the rotational speed detector 143 shown in FIG. 6. The embodiment uses the pulse signal generated by the rotational speed detector 143 to calculate the rotating speed. In detail, the rotational speed detector 143 includes a rotor detector 147 and a speed estimator 148. The rotor detector 147 is a sensing element that generates a preset number of pulses when the rotor turns one round, and the speed estimator 148 is used to estimate the rotating speed based on the pulses. The methods of estimating the rotating speed can be illustrated as the following equations, the first equation is used to count the pulse number of the rotor detector 147 in a unit time period, and the second equation is used to count the time period required for the rise edge of the pulse.

$$\text{Speed} \propto \frac{n \times \text{pulses}}{T} \quad (1)$$

$$\text{Speed} \propto \frac{1}{T_r} \quad (2)$$

Figure 8:
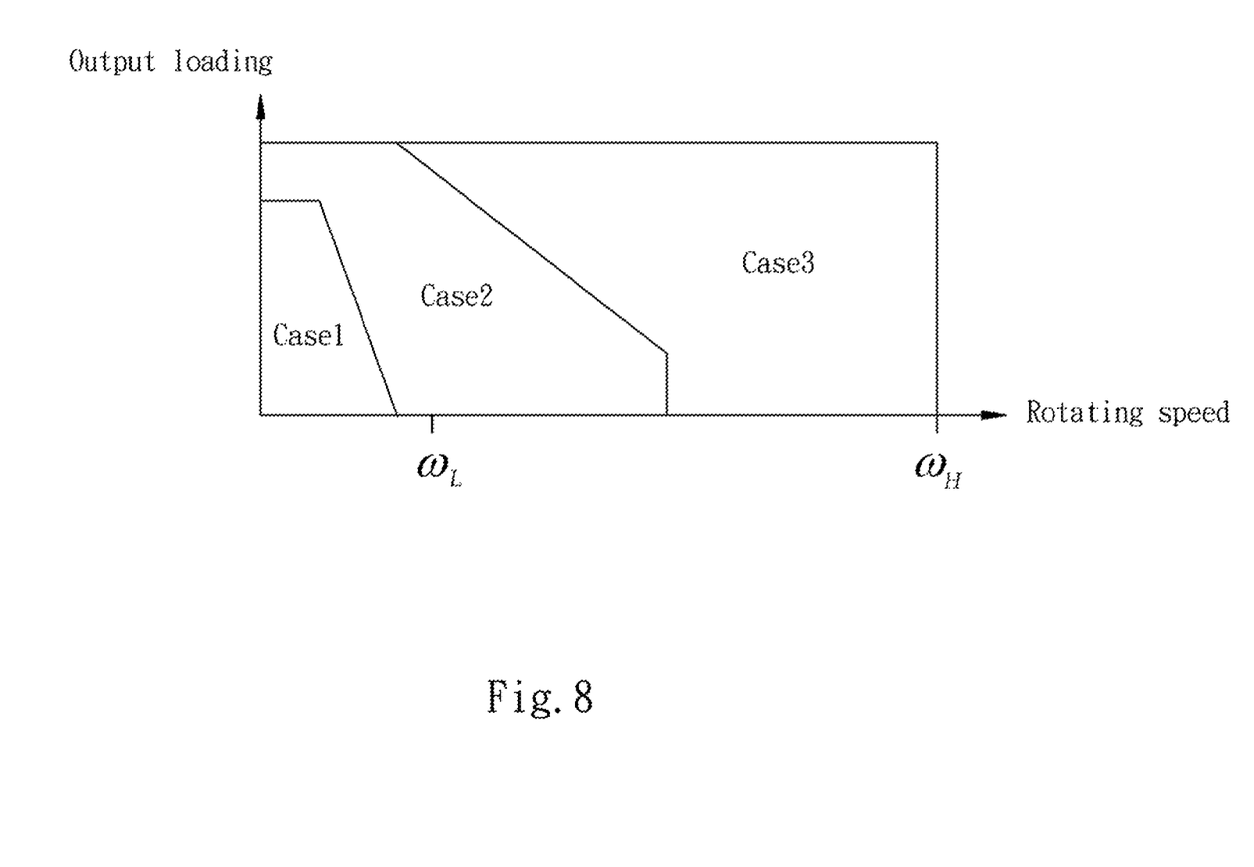
FIG. 8 is a schematic view of the operational strategy of the energy conditioning circuit 141 in FIG. 1.

Referring to FIG. 8, FIG. 8 is a schematic view of the operational strategy of the energy conditioning circuit 141 in FIG. 1. The strategies, i.e. the cases 1-3 respectively corresponding to the first, second and third control strategies described above, of the energy managing circuit 140 under the generator mode are selected based on the output loading and the rotating speed of the generator 130. What is worth to be noticed is that the strategy chart in FIG. 8 is generated by the processing module 145 and provided to the energy conditioning circuit 141 to be applied. The magnitude of the generation power can be estimated by equation $P_2(=V_2I_2)$, and thus be used to select the strategies, i.e. cases 1-3. Since the generated power is proportional to that the rotating speed multiplies the output loading, the strategy case 3 means the generated power is large enough to be feedback to the electrical grid.

The energy conditioning circuit 141 not only provides the required powers, such as the low voltage power sources 5V, 15V and −15V, to the modules and elements of the system 100, but also charges or discharges the battery 150. The strategy that when the energy conditioning circuit 141 charge or discharge the battery 150 depends on the status of the user and the state of charge (SOC) of the battery 150.

Figure 9:
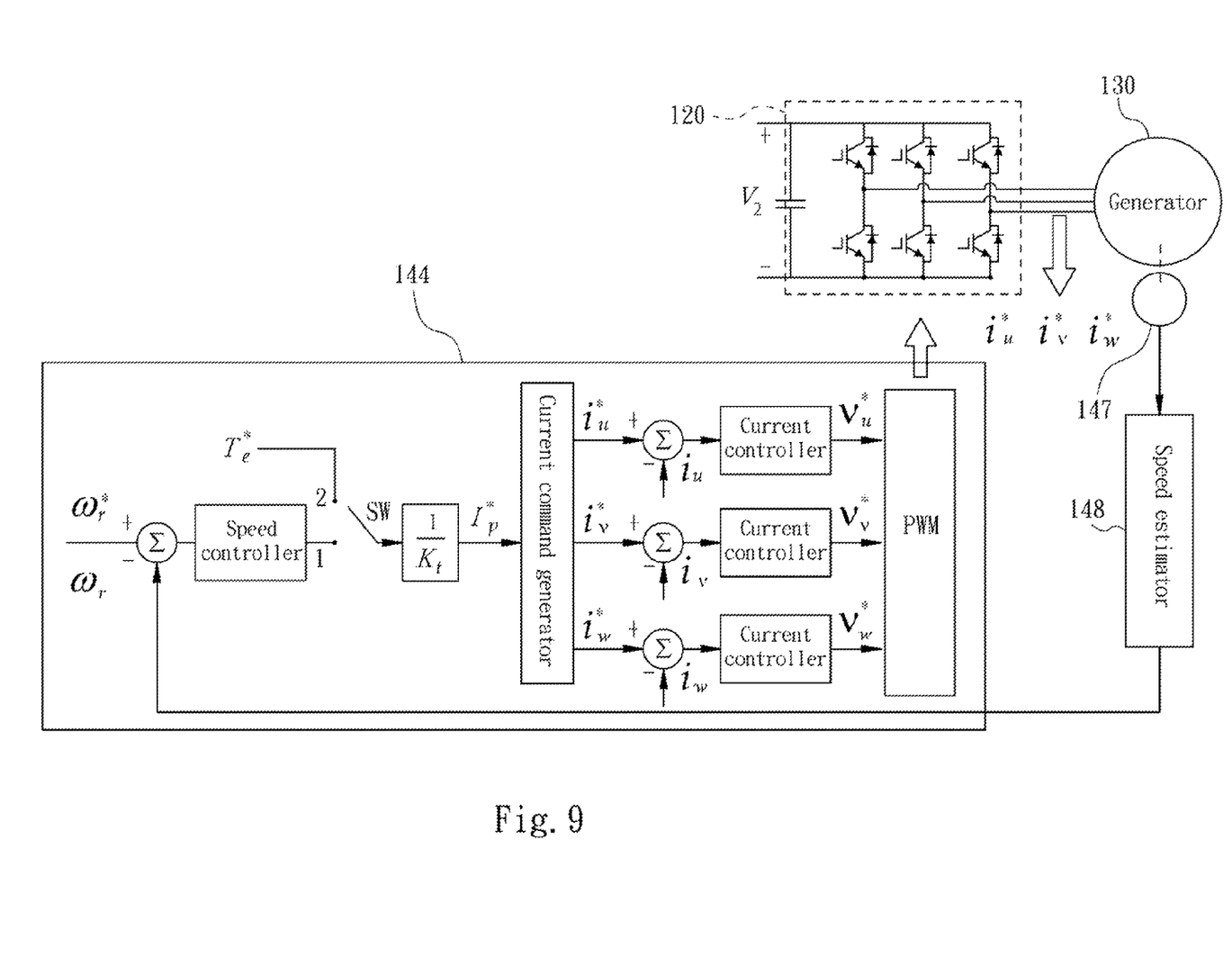
FIG. 9 is a functional block view of the drive controlling module 144 shown in FIG. 6.

Referring to FIG. 9, FIG. 9 is a functional block view of the drive controlling module 144 shown in FIG. 6. The meanings of the symbols are illustrated as following. The symbol $I_p^*$ means the peak value of the current command of to the three phase stator winding. The symbols $i_u^*$, $i_v^*$, $i_w^*$ mean the current commands of the three phase stator winding. The symbols $i_u$, $i_v$, $i_w$ mean the current values of the three phase stator winding. The symbol $T_e^*$ means the required output loading of the generator 130. The symbol $\omega_r^*$ means the rotating speed command of the generator 130. The symbol $\omega_r$ means the rotating speed of the generator 130. The symbol $K_t$ means the torque constant of the generator 130.

The drive controlling module 144 operates the generator 130 under the motor or generator mode based on the enactment received by the operating interface 160. When the generator 130 is operated under the motor mode, the switch SW is located at the position 1 and a speed controller is enabled to force the rotating speed and the three phase stator currents of the generator 130 to be controlled based on the rotor magnetic flux position. The speed close loop control mode commands the speed value $\omega_r$ to follow the speed command $\omega_r^*$, wherein the command is obtained from the user or preset in the system. The output value of the speed controller is multiplied by $$\frac{1}{K_t}$$

to be the peak value $I_p^*$.

When the generator 130 is operated under the generator mode, the switch SW is located at the position 2, and the system 100 is controlled by the loading, i.e. follow the characteristic chart in FIG. 5A or FIG. 5B to select the strategies. Meanwhile, the output loading $T_e^*$ of the generator 130 is used to generate the peak value $$I_p^* = \frac{T_e^*}{K_t}.$$

The peak value $I_p^*$ generated either under the generator mode or the motor mode is provided to the current command generator to generate the three phase current commands $i_u^*$, $i_v^*$, $i_w^*$. The three phase commands $i_u^*$, $i_v^*$, $i_w^*$ can be in the similar square wave form or sinusoidal wave form. The deviation between the three phase current values $i_u$, $i_v$, $i_w$, and the three phase commands $i_u^*$, $i_v^*$, $i_w^*$ is entered into a current controller and further provided to a pulse width modulation (PWM) circuit to generate the PWM signal to control the bidirectional power drive 120. Therefore, the generator 130 is driven by the controlled voltage and frequency of the bidirectional power drive 120 that triggered by current commands.

Figure 10A:
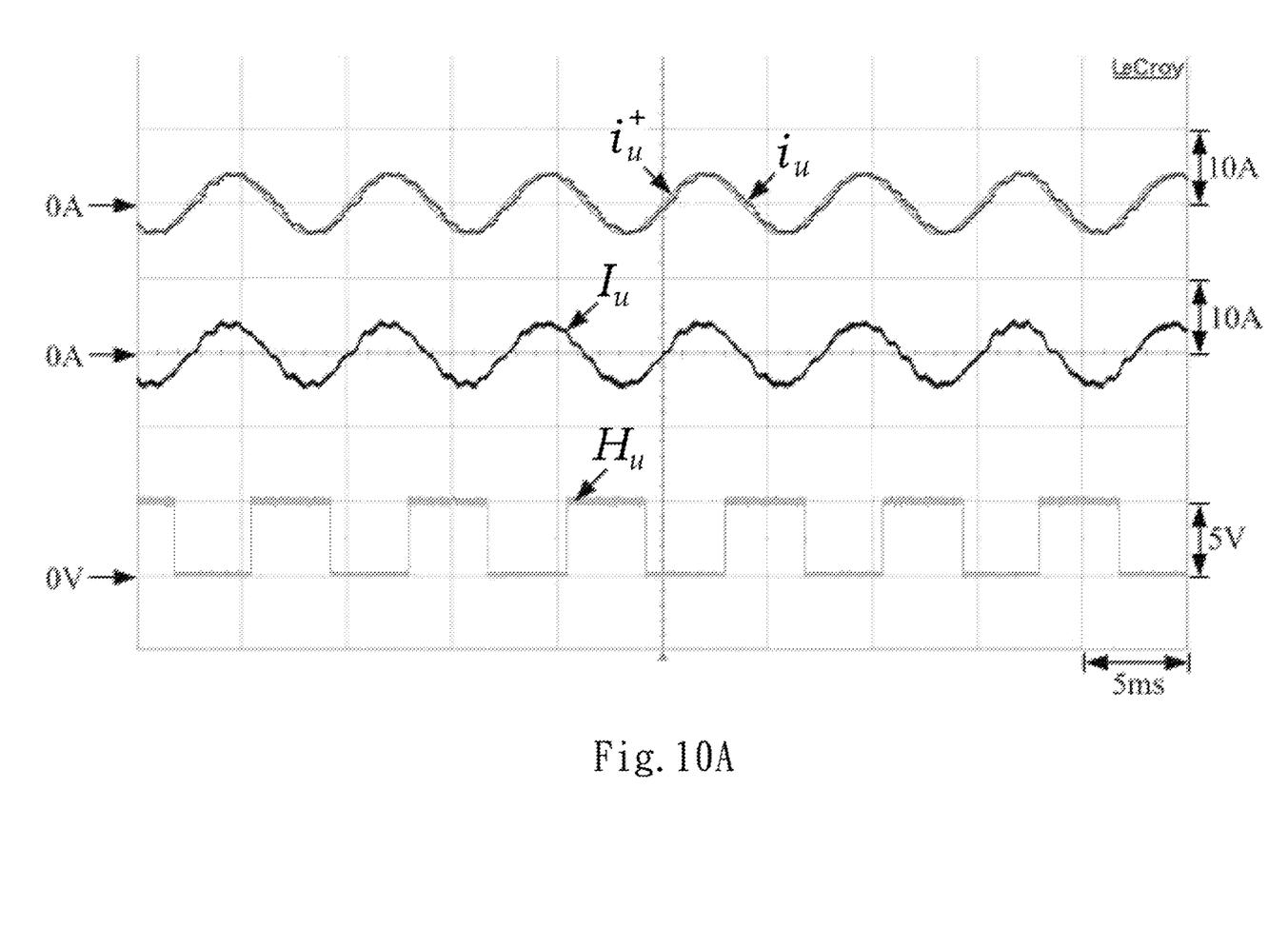
FIG. 10A is a waveform diagram while the generator 130 controlled by the six step wave current.
Figure 10B:
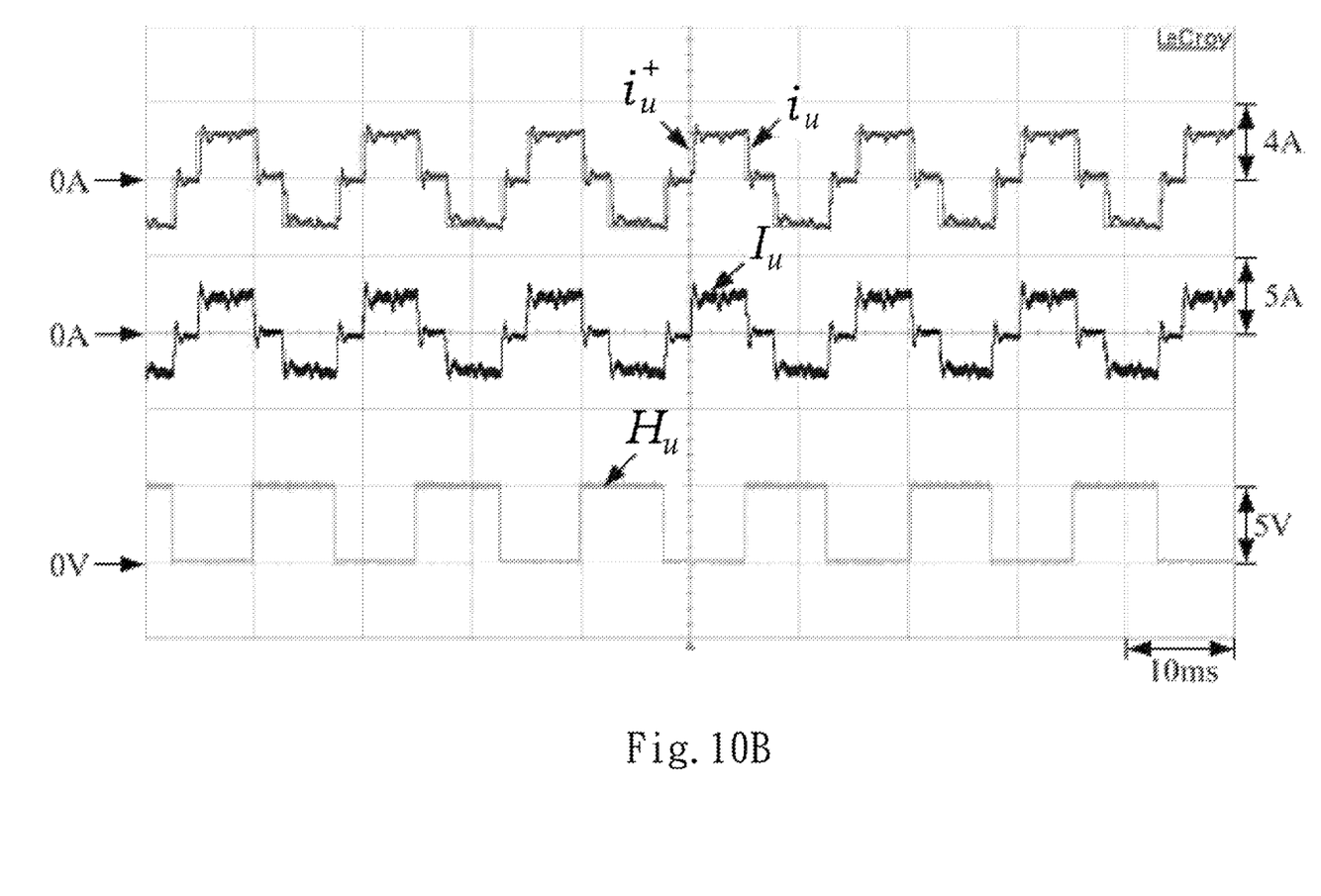
FIG. 10B is a waveform diagram while the generator 130 is controlled by the three phase sinusoidal wave current.

Referring to FIG. 10A and FIG. 10B together, FIG. 10A is a waveform diagram while the generator 130 controlled by the six step wave current, and FIG. 10B is a waveform diagram while the generator 130 is controlled by the three phase sinusoidal wave current. In FIG. 10A and FIG. 10B, the three phase current command $i_u^*$, $i_v^*$, $i_w^*$ can be in the six step wave form or sinusoidal wave form, and the three phase stator currents $i_u$, $i_v$, $i_w$ are forced to follow the commands respectively. Therefore, the system 100 optimizes the efficiency of the generator 130 either in the generator or motor mode by controlling the wave form, the magnitude or the frequency of the input current.

Generally, the three phase controlling mechanism requires a high signal resolution device to be the rotor detector 147 that costs about 10 US dollars but provides low noise and vibration. On the other hand, the six step wave controlling mechanism can be satisfied by using a low signal resolution device to be the rotor detector 147 that costs about 0.5 US dollars but causes high noise and vibration. However, the embodiments described above can be achieved by using the low signal resolution device to be the rotor detector 147 but achieve the three phase controlling mechanism via the firmware design of the processing module 145, and thus the advantages of the three phase controlling mechanism and the six step wave controlling mechanism are taken without inheriting their shortcomings.

In other embodiments, the energy managing circuit 140 further includes an identification device, a memory and a communicating device electrically connected to the processing module 145. The identification device is applied to identify the user, the memory is applied to store the data of the generated power by the user, and the communicating device, such as a wireless device, is applied to transmit the data to a data center. In detail, the identification information and the operating data of using the fitness equipment of each user can be obtained, stored and identified by the system 100, and thus a statistic about the generated powers of many users can be made by the data center. Therefore, the contribution of each user is recorded and can be applied in many commercial mechanisms. What is worth to be noticed is that the data described above include the information such as the heart rate, the exercise time period and the location of the user.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fitness equipment energy regenerating and saving system performing an electrical power exchange without utilizing an energy storage device, comprising:
a bidirectional power converter having a plurality of power transistors, wherein one end of the bidirectional power converter is electrically and directly connected to an electrical grid;
a bidirectional power drive, wherein one end of the bidirectional power drive is electrically and directly connected to the other end of the bidirectional power converter;
a generator electrically and directly connected to the other end of the bidirectional power drive for linking up a fitness equipment, the generator can be driven by the bidirectional power drive and performs as a motor; and
an energy managing circuit electrically connected to the bidirectional power converter, the bidirectional power drive and the generator for determining whether the generator is operated in a generator mode or a motor mode;
wherein the energy managing circuit activates the bidirectional power converter so as to enable the bidirectional power drive to feedback the power generated by the generator to the electrical grid directly through the bidirectional power converter when the generator is operated in the generator mode;
wherein the energy managing circuit sets the bidirectional power converter so as to enable the bidirectional power drive to obtain the power required for driving from the electrical grid directly through the bidirectional power converter when the generator is operated in the motor mode.

2. The fitness equipment energy regenerating and saving system of claim 1, wherein the bidirectional power converter comprises a bidirectional power transforming circuit and a bidirectional DC voltage converter.

3. The fitness equipment energy regenerating and saving system of claim 2, wherein the bidirectional power transforming circuit is a full bridge rectifier circuit composed by four power transistors.

4. The fitness equipment energy regenerating and saying system of claim 2, wherein the bidirectional power transforming circuit is a half bridge rectifier circuit composed by two power transistors.

5. The fitness equipment energy regenerating and saving system of claim 2, wherein the bidirectional DC voltage converter is a buck boost circuit.

6. The fitness equipment energy regenerating and saving system of claim 1, wherein the energy managing circuit comprises an energy conditioning circuit and a processing circuit.

7. The fitness equipment energy regenerating and saving system of claim 6, wherein the processing circuit further comprises:
- a rotational speed detector for detecting a rotational speed of the generator under the generator mode;
- a drive controlling module for optimizing the output voltage that the bidirectional power drive obtains from the generator and provides to the electrical, grid in accordance with the rotational speed when the generator is under the generator mode, and for controlling the output current that the bidirectional power drive obtains from the electrical grid and provides to the generator to control the speed of the generator when the generator is under the motor mode;
- a processing module for determining an output loading of the generator under the generator mode based on the rotational speed, the expected generating power of the generator and a parameter received by the operating interface that represents the requirement of a user when exercising, and for commanding the energy managing circuit to feedback the generated power transformed from the exercising of the user to the electrical grid via the bidirectional power converter in an alternating current manner; and
- a voltage compensation module for collaborating with the energy conditioning circuit to control the output DC voltage of the bidirectional power drive.

8. The fitness equipment energy regenerating and saving system of claim 7, wherein the drive controlling module is a pulse-width modulation (PWM) circuit.

9. The fitness equipment energy regenerating and saving system of claim 7, further comprising an identification device electrically connecting the processing module for identifying the user.

10. The fitness equipment energy regenerating and saving system of claim 7, further comprising a memory electrically connecting the processing module for storing the data of the generated power.

11. The fitness equipment energy regenerating and saving system of claim 10, further comprising a communicating device electrically connecting the processing module for transmitting the data.

12. The fitness equipment energy regenerating and saving system of claim 11, wherein the communicating device is a wireless device.

13. The fitness equipment energy regenerating and saving system of claim 6, wherein the energy conditioning circuit provides at least two strategies to be selected by the processing circuit in the generator mode.

14. The fitness equipment energy regenerating and saving system of claim 1, wherein the bidirectional power drive activates the generator to be the motor in the motor mode, and thus to move the limbs of a user actively.

15. A fitness equipment energy regenerating and saving system, comprising:
- a bidirectional power converter having a plurality of power transistors, wherein one end of the bidirectional power converter is electrically connected to an electrical grid;
- a bidirectional power drive, wherein one end Of the bidirectional power drive is electrically connected to the other end of the bidirectional power converter;
- a generator electrically connected to the other end of the bidirectional power drive and linked to a fitness equipment, wherein the generator is driven by the bidirectional power drive and performs as a motor, or is driven as a result of operation of the fitness equipment by a user to generate a power;
- an energy managing circuit electrically connected to the bidirectional power converter, the bidirectional power drive and the generator; and
- a discharging module which is able to discharge electricity power;
- wherein when the power generated by the generator is smaller than a threshold value, the energy managing circuit:
- disables the bidirectional power converter;
- when there is a battery in the fitness equipment energy regenerating and saving system and the battery is not fully charged, uses the power generated by the generator to charge the battery; and
- when there is a battery in the fitness equipment energy regenerating and saving system and the battery is fully charged, releases the power via the discharging module.

16. The fitness equipment energy regenerating and saving, system of claim 15, wherein when the power generated by the generator is smaller than the threshold value and there is no battery in the fitness equipment energy regenerating and saving system, the energy managing circuit releases the power via the discharging module or applies the power to each element in the fitness equipment energy regenerating and saving system directly.

17. The fitness equipment energy regenerating and saving system of claim 15, wherein when the power generated by the generator is greater than the threshold value, the energy managing circuit activates the bidirectional power converter and the power is transmitted to the electrical grid through the bidirectional power drive.

18. The fitness equipment energy regenerating and saving system of claim 17, wherein when there is a battery in the fitness equipment energy regenerating and saving system and the battery is not fully charged, the power is also used to charge the battery.

* * * * *